United States Patent [19]

Dudden

[11] Patent Number: 4,729,260
[45] Date of Patent: Mar. 8, 1988

[54] TWO SPEED GEARBOX

[75] Inventor: Christopher J. Dudden, Dorset, England

[73] Assignee: Desoutter Limited, London, England

[21] Appl. No.: 938,905

[22] Filed: Dec. 8, 1986

[30] Foreign Application Priority Data

Dec. 6, 1985 [GB] United Kingdom ............... 8530107
Jan. 13, 1986 [GB] United Kingdom ............... 8600687

[51] Int. Cl.$^4$ .............................................. F16H 3/74
[52] U.S. Cl. ................................... 74/752 B; 74/751; 173/163; 81/57.11
[58] Field of Search ...................... 74/752 B, 751, 785, 74/337; 173/163; 81/57, 57.11

[56] References Cited

U.S. PATENT DOCUMENTS

| | | | |
|---|---|---|---|
| 3,187,860 | 6/1965 | Simmons | 74/751 X |
| 3,257,877 | 6/1966 | Ulrich et al. | 74/751 X |
| 3,845,673 | 11/1974 | Karden et al. | 74/751 |
| 3,960,035 | 6/1976 | Workman, Jr. et al. | 74/785 |
| 4,215,594 | 8/1980 | Workman, Jr. et al. | 74/751 |
| 4,366,871 | 1/1983 | Dieterle et al. | 173/163 |
| 4,513,827 | 4/1985 | Dubiel | 173/12 |
| 4,649,774 | 3/1987 | Karlsson et al. | 74/751 |

Primary Examiner—Dirk Wright
Attorney, Agent, or Firm—Holman & Stern

[57] ABSTRACT

A two speed gearbox comprises an input shaft, an output shaft and a reduction gear mechanism, such as an epicyclic gear mechanism, having high speed low torque and low speed high torque output drives. A dog clutch connects the high speed output drive to the output shaft when the clutch is fully engaged. A slidable coupling is rotatable with the low speed output drive and is movable between a first position in which it is disconnected from the output shaft and a second position in which it is connected to the output shaft for driving the latter. A weak spring urges the slidable coupling towards its second position and means, such as a strong compression spring, urges the clutch members of the clutch in to full engagement. A radial flange on the driven clutch member and balls held captive with the slidable coupling interact to maintain the slidable coupling in its first position against the urging force of the weak spring while the clutch members are maintained in full engagement by the compression spring. However, when the torque applied to the output shaft exceeds a predetermined value the clutch members will begin to part and the slidable coupling will engage the output shaft. When the coupling is fully engaged with the output shaft the balls and radial flange will interact to maintain the clutch members fully out of engagement.

14 Claims, 9 Drawing Figures

TWO SPEED GEARBOX

BACKGROUND TO THE INVENTION

1. Field of Invention

This invention relates to a two speed gearbox and to a power tool incorporating such a gearbox.

2. Description of Prior Art

A known two speed gearbox incorporated in a nut running power tool is described in U.K. Pat. No. 808983. This known gearbox comprises a two speed epicyclic gear mechanism, a slipping clutch which transmits the higher speed drive and a free wheel or over-running clutch which automatically connects the spindle of the nut-engaging device with the lower speed drive when the first mentioned clutch slips. It has two major disadvantages. Firstly it cannot operate in reverse. This is a serious drawback in modern machine tools where it is often a requirement to tighten a nut to say about 80% of its final torque, and then undo the nut before running it down to its final torque. Secondly, the clutch members of the slipping clutch are never fully disengaged when the gearbox is operating at the lower of its two output speeds. This creates undesirable noise and damage to the clutch members.

U.K. Pat. No. 987,209 corresponding to U.S. Pat. No. 3,187,860, describes a two speed gearbox with a reduction gear which has a high speed low torque output drive and a low speed high torque output drive. A torque sensitive clutch connects the high speed output drive to an output shaft and includes a driven member in the form of a transverse pin which is movable along helical slots in the output shaft. A slidable coupling, rotatable with the output shaft and permanently engaged by the transverse pin, is movable between a first position in which it is disconnected from the low speed output drive and a second position in which it is connected to the drive in order to drive the output shaft. A compression spring releasably maintains the clutch in engagement and also maintains the slidable coupling in its first position while the clutch is engaged. The transverse pin running in the helical slots maintains the clutch fully out of engagement when the slidable coupling is in its second position. A disadvantage of this arrangement is that the pin is used both for torque transmission, at both speeds, and for moving the slidable coupling, and is therefore subject to heavy wear and high risk of failure. The gearbox cannot operate in reverse.

BRIEF SUMMARY OF THE INVENTION

The present invention provides a two speed gearbox comprising:

an input shaft and an output shaft;

a reduction gear mechanism drivable by the input shaft and having a high speed low torque output drive and a low speed high torque output drive;

a clutch having driving and driven clutch members, one of which is axially movable relative to the other, the clutch connecting the high speed output drive to the output shaft when the clutch members are fully engaged;

a slidable coupling rotatable with one of the low speed output drive and the output shaft and movable between a first position in which it is disconnected from the other of the low speed output drive and the output shaft and a second position in which it is connected thereto for driving the output shaft;

means for urging the slidable coupling towards its second position;

means for releasably maintaining the clutch members in full engagement;

means for maintaining the slidable coupling in its first position against the force of said urging means while the clutch members are maintained in full engagement; and means for maintaining the clutch members fully out of engagement when the slidable coupling is in its second position;

characterized in that the clutch, the urging means, and the maintaining means are effective in both directions of rotation of the input shaft.

Preferred and/or optional features of the invention are described hereinafter.

The invention also provides a power tool having a motor and a gearbox according to the invention housed in a common casing.

The reduction gear mechanism may be an epicyclic gear mechanism, preferably comprising a sun gear, a planet carrier, a fixed ring gear, and a plurality of planet gears rotatably supported by the planet carrier and engaging with the sun gear and the fixed ring gear, the input shaft of the gearbox and the high speed output drive of epicyclic gear mechanism being connected to the sun gear and the low speed output drive of the epicyclic gear mechanism being connected to the planet carrier.

The invention will now be more particularly described, by way of example, with reference to the accompanying drawings.

DETAILED DESCRIPTION OF PREFERRED EMBODIMENTS

Figure 1:
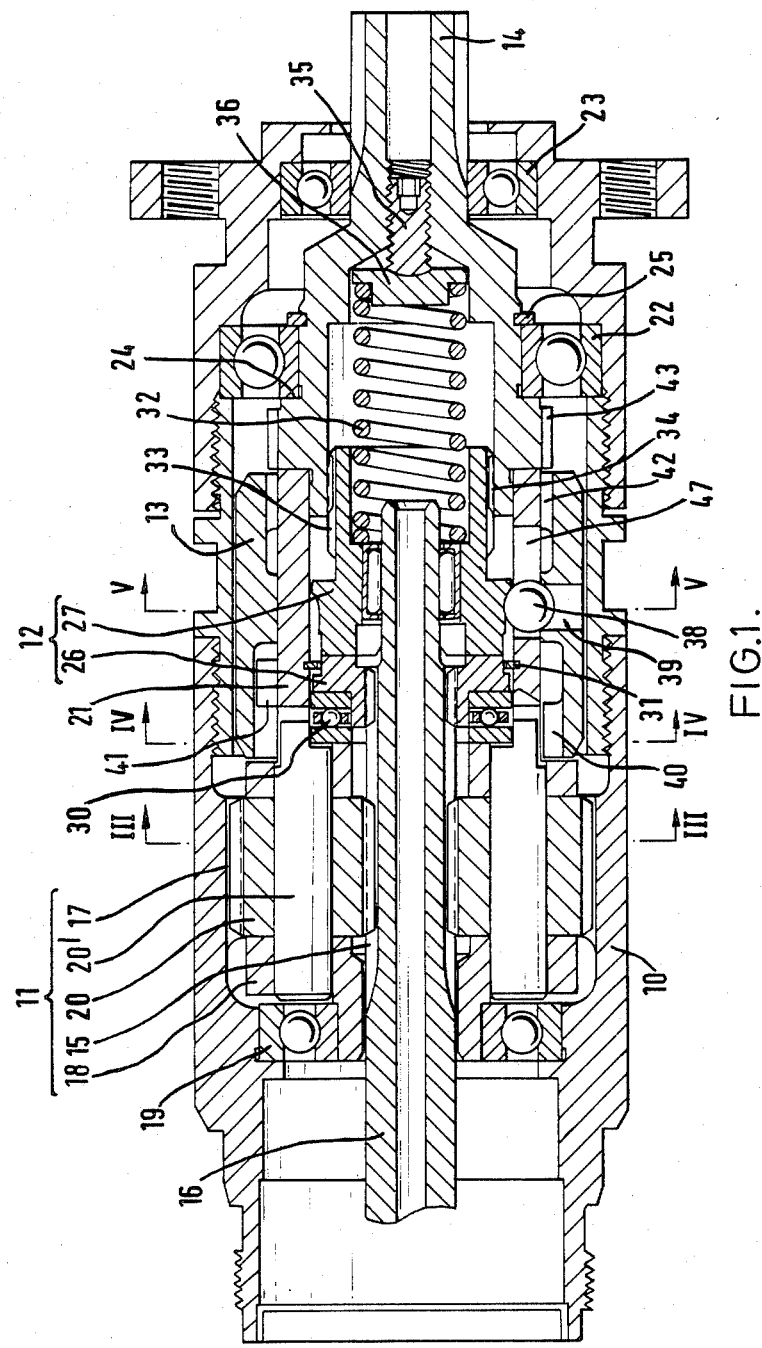
FIG. 1 is a longitudinal cross-sectional view of one embodiment of a two speed gearbox according to the present invention, the section being taken along line I—I of FIG. 3.
Figure 2:
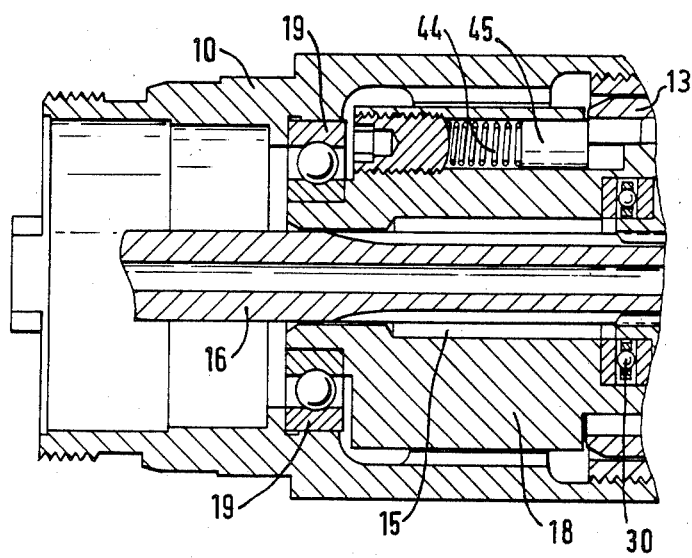
FIG. 2 is a fragmentary longitudinal cross-sectional view of the gearbox of FIG. 1 taken along line II—II of FIG. 3.
Figure 3:
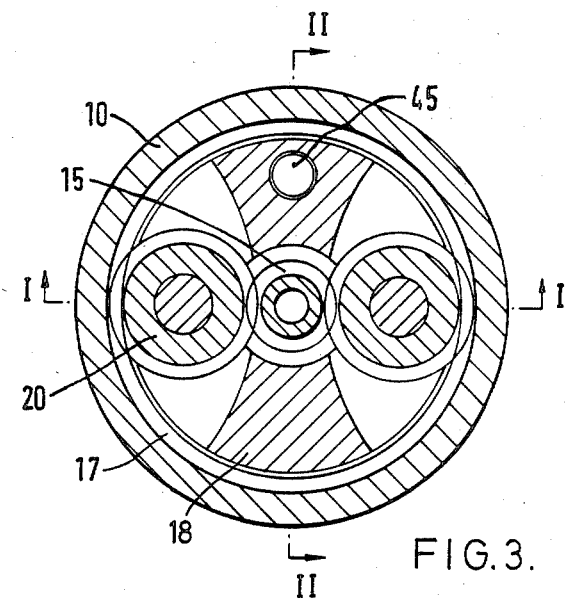
FIG. 3 is a cross-sectional view taken along line III—III of FIG. 1.

Referring firstly to FIGS. 1–7, the gearbox shown therein has a casing 10 formed in three parts which are screw-threadably connected together. The casing 10 houses an epicyclic gear mechanism 11, a high speed clutch assembly 12, a slidable coupling 13 and an output shaft 14.

The epicyclic gear mechanism 11 comprises a sun gear 15 provided on a shaft 16 which serves both as an input shaft and as a high speed output drive of the gearbox, a fixed ring gear 17 formed on the casing 10, a planet carrier 18 journalled for rotation in bearing 19, and two planet gears 20 mounted for rotation on respective planet spindles 20' in the planet carrier 18. The planet gears 20 co-operate with the sun gear 15 and fixed ring gear 17 to drive the planet carrier 18 in the same direction of rotation as the sun gear 15 but at a much reduced speed.

The planet carrier 18 has a tubular extension forming a hollow shaft which serves as a slow speed output drive 21 of the epicyclic gear mechanism 11.

The output shaft 14 is journalled for rotation in bearings 22 and 23. The rear portion of the output shaft 14 is generally cup-shaped and at its rearmost end it extends into the output drive 21 so as to act together with the bearing 19 to support the planet carrier 18 for rotation in the casing 10. The output shaft 14 is fixed against axial movement in the casing 10 by the bearing 22, a shoulder 24 on the output shaft, and circlip 25. The planet carrier 18 is fixed against axial movement in the casing by the bearing 19 and the output shaft 14.

The high speed clutch assembly 12 is accommodated within the slow speed output drive 21 and the generally cup-shaped rear end of the output shaft 14. The clutch assembly 12 comprises a driving clutch member 26 and a driven clutch member 27 which have mutually engageable inclined dogs 28 and 29, respectively, (see FIG. 7). The driving clutch member 26 is fixed against axial movement by a thrust bearing 30 and a circlip 31 and is splined to the shaft 16 for rotation therewith. The driven clutch member 27 is urged into engagement with the driving clutch member 26 by a compression spring 32 and has external splines 33 which remain in permanent engagement with internal splines 34 on the output shaft 14. The compression of the spring may be varied by a screw 35 and pressure plate 36.

The slidable coupling 13 is in the form of a sleeve. Three balls 38 are held captive in respective holes 39 in the sleeve 13 by the driven clutch member 27 (see FIGS. 1 and 5).

Figure 4:
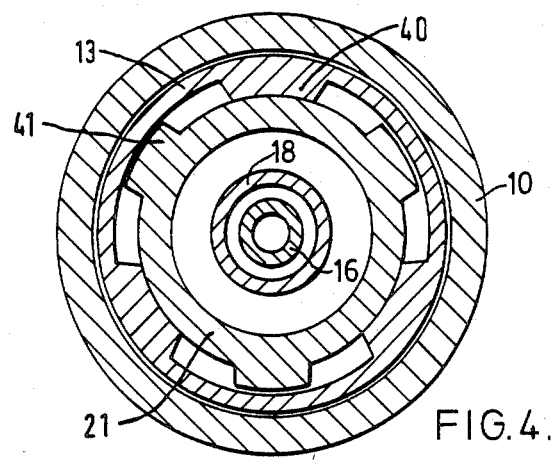
FIG. 4 is a cross-section view taken along line IV—IV of FIG. 1.

At its rear end, i.e. its end remote from the output shaft 14, the slidable coupling 13 has three equi-angularly spaced teeth 40 which are arranged so that in the rest position of the gearbox they are positioned centrally between three equi-angularly spaced teeth 41 on the slow speed drive 21 (see in particular FIG. 4). The teeth 40 and 41 are arranged to allow approximately 26 degrees of angular movement of the coupling 13 relative to the slow speed drive 21 in either direction from the rest position shown in FIG. 4 for a purpose which will become apparent later.

At its other end, the coupling 13 has a fine toothed internal spline 42 which is arranged to mate easily with a fine toothed external spline 43 on the rear end of the output shaft 14.

As shown in the drawings the coupling 13 is in a first position in which it splines 42 are fully disengaged from the splines 43 on the output shaft. The coupling 13 is urged towards a second position in which the splines 42 mate with the splines 43 by a weak compression spring 44 and plunger 45 housed in the planet carrier 18 (see FIGS. 2 and 3). However, the compression spring 32 is much stronger than the spring 44 and consequently in the rest position of the gearbox the coupling 13 is held in its first position by engagement between a radial flange 46 (see FIG. 7) on the driven clutch member 27 and the balls 38 which as previously described are held captive with the coupling 13.

Figure 5:
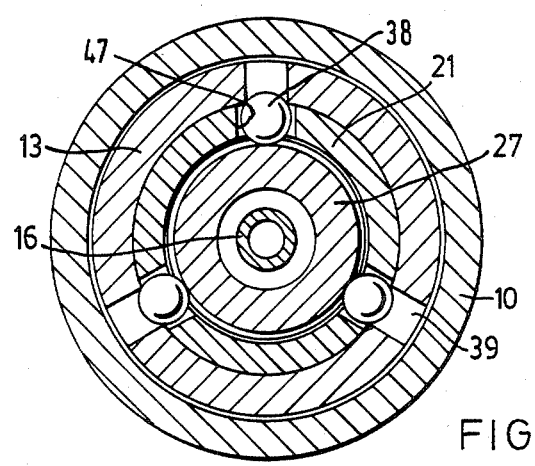
FIG. 5 is a cross-section view taken along line V—V of FIG. 1.
Figures 6, 7:
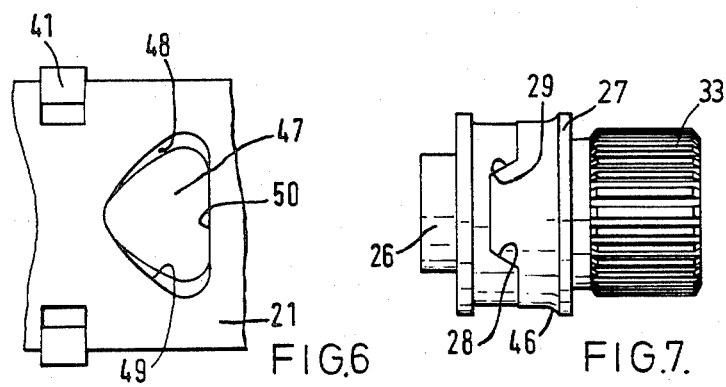
FIG. 6 is a fragmentary elevational view showing in detail one of the apertures in the slow speed output drive of the epicyclic gear mechanism of FIG. 1.
FIG. 7 is a fragmentary elevational view showing the high speed clutch assembly of FIG. 1.

As will be seen from FIGS. 1 and 5, the balls 38 extend through respective apertures 47 in the slow speed drive 21. As will be seen more clearly from FIG. 6 these apertures have two generally helical edges 48 and 49 of opposite hand and a circumferentially extending edge 50 bordering that side of the aperture adjacent to the output shaft 14. The purpose of the edges 48 and 49 will become apparent later but for the moment suffice it to say that in the rest position of the gearbox the balls 38 lie adjacent to the adjoining ends of the two edges 48 and 49 of their respective apertures.

The above described gearbox may have numerous applications but it is primarily (but not exclusively) intended for use in a power tool and especially a nut runner or screwdriver.

Experience has shown that such tools operate most efficiently if the first part of the motion is conducted at high speed and relatively low torque and the last part of the motion (when the nut, screw or the like is nearly home) at a lower speed and higher torque until the motor stalls or is switched off.

In operation the shaft 16 is driven by a motor, which will be housed in a rearward extension of the casing 10, via reduction gearing. During the first part of the motion the output shaft 14 will be driven at the same speed as the shaft 16 and sun gear 15 by the high speed clutch assembly 12. During this time the planet carrier 18, slow speed output drive 21, and slidable coupling 13 will all rotate at a much lower speed determined by the number of teeth on the sun gear, planet gears and ring gear of the epicyclic gear mechanism, with the balls 38 of the slidable coupling 13 rolling on the outer surface of the driven clutch member 27.

When the torque applied to the output shaft 14 exceeds a predetermined value set by the compression of spring 32 the driven clutch member 27 will move away from the driving clutch member 26 under the effect of the inclined surfaces of the dogs 28, 29. This will release the balls 38 sufficiently to allow the spring 44 and plunger 45 to cause the coupling 13 to move forward until the fine toothed splines 42 come into engagement with the fine toothed splines 43 on the output shaft 14, halting the rotation of the coupling 13. The slow speed drive 21 will consequently rotate relative to the coupling 13 and one of the helical edges 48, 49 of each aperture 47 in the slow speed drive 21 will engage its respective ball 38 and the balls 38, the coupling 13 and the driven clutch member 27 will be pushed forwards until the splines 42 fully co-operate with the splines 43. At this stage the teeth 40 on the coupling 13 will come into contact with the teeth 41 on the slow speed drive 21 and the output shaft 14 will be driven at the same speed as the planet carrier 18 until the motor eventually stalls or is switched off or reversed. The driven clutch member 27 is held fully disengaged from the driving clutch member 26 by engagement between the balls 38 and the flange 46 on the driven clutch member.

If the load on the output shaft 14 is released, then the force of the spring 32 will overcome the force applied to the balls 38 by the helical edges of the apertures 47. The driven clutch member 27 will be pushed back into engagement with the driving clutch member 26 and the coupling 13 will be disengaged from the output shaft 14. Consequently, the gearbox will revert to a 1:1 ratio.

The gearbox described above has the additional advantage that it will operate equally well in either direction. Indeed when used in a nut running tool it is possible to run the nut down to say about 80% of its final torque to remove all burrs, and then undo the nut by reversing the motor of the tool before running it down to its final torque. Such an operation could be achieved automatically using torque sensors and a motor control unit.

Figure 8:
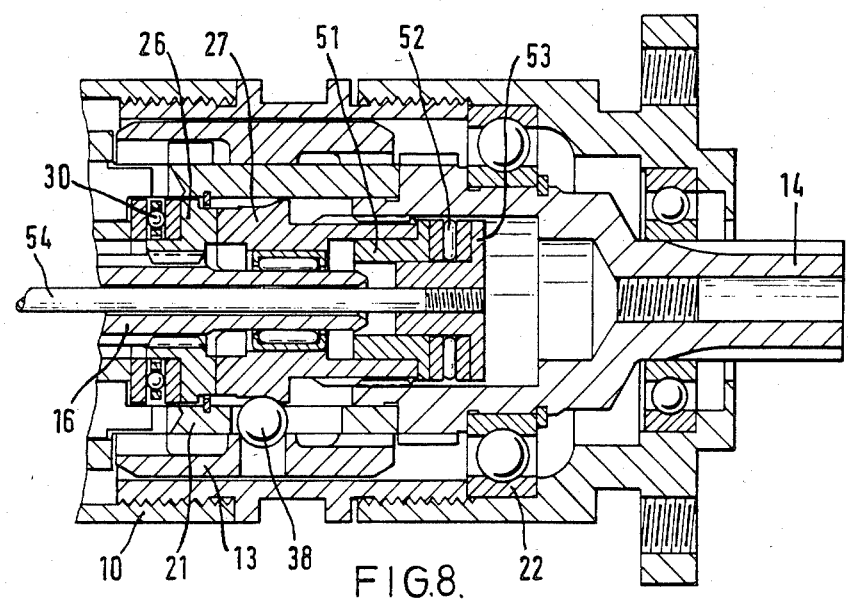
FIG. 8 is a longitudinal cross sectional view of part of another embodiment of a two speed gearbox according to the invention.

FIG. 8 shows another embodiment of the gearbox in which the compression spring 32, screw 35 and pressure plate 36 are replaced by a location plate 51, a thrust bearing 52 and a pressure plate 53. Moreover, a tie rod 54 is attached to the pressure plate 53 and passes through the shaft 16. The remaining parts of the gear box of FIG. 8 are identical to the gear box of FIG. 1 and for ease of reference the same parts them are given the same reference numerals.

Figure 9:
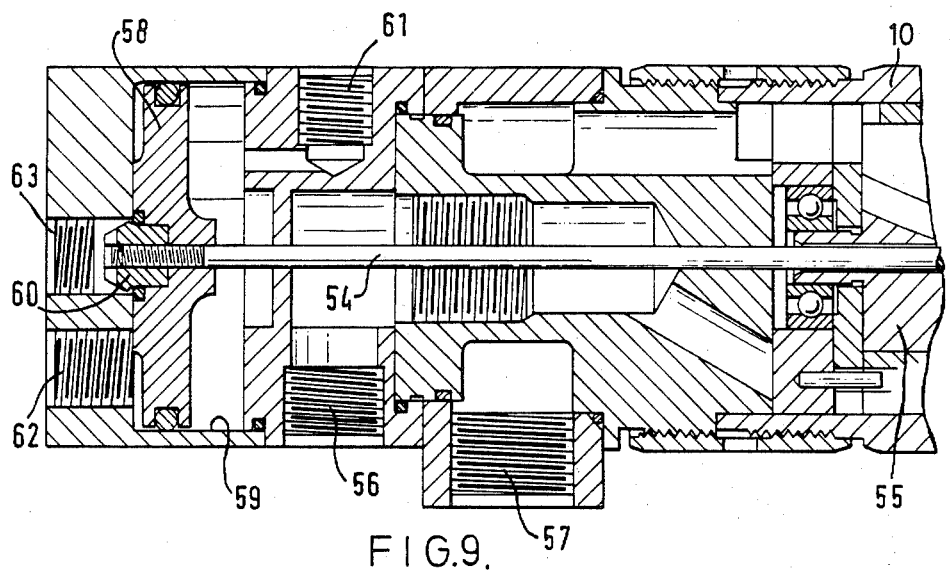
FIG. 9 is a longitudinal cross-sectional through a control top and part of a motor assembly for use with the gearbox of FIG. 8.

FIG. 9 shows a remote control device and part of a motor assembly for use with the gearbox of FIG. 8. The motor is, as shown, a pneumatic motor 55 having associated inlet and exhaust ports 56 and 57 respectively. The tie rod 54 extends through the center of the motor assembly including any reduction gearing and is attached by a screw thread to a piston 58 movable in a cylinder 59 in the remote control device. The length of the tie rod 54 is adjusted by the amount it is screwed into the piston 58 such that when the piston 58 is hard against the left hand end face of the cylinder 59, as viewed in FIG. 9, the clutch members 26 and 27 are fully engaged and hard against the thrust bearing 30.

The piston 58 is provided with an operation sensing valve 60 and the remote control device has three ports 61, 62 and 63 which communicate with the cylinder 59.

The remote control device can be operated in anyone of four different modes which will be described below.

(1) Auto Change high to low/low to high

Compressed air is supplied to port 61 of the cylinder 59, via a pressure regulating valve (not shown), this valve being adjusted to cause the piston 58 to be held in the retracted position shown, closing the operation sensing valve 60.

With the gearbox in operation, applying a load of sufficient torque to the output shaft 14, will cause the driven clutch member 27 to be moved away from the driving clutch member 26. The pressure plate 53 will move with the driven clutch member 27 and will pull the tie rod 54 and the piston 58 forward.

The torque at the output shaft 14 to cause this will be controlled by the pressure applied to port 61 of the cylinder 59.

It should be noted that the piston 58, the tie rod 54, and the pressure plate 53, do not rotate, whereas the clutch assembly 12 rotates in either a LH or RH direction. To cater for this the thrust bearing 52 has been provided.

(2) Auto Change high to low

Controlled change low to high

This mode of operation is similar to (1) above but with the following additions.

The regulated air supply at port 61 is also supplied to port 63 of the cylinder 59. When the piston 58 is pulled forward, the operation sensing valve 60 is opened. This will allow the air present at port 63 to flow into the rear chamber of the cylinder 59. At this point an air signal will be present at port 62; this will indicate that a gear change has occured. If this signal is not required, then port 62 is plugged.

To reset back into high speed the torque at the output shaft 14 has to be reduced sufficiently, and the pressure at port 63 cut and exhausted. This will allow the pressure at port 61 to return the piston 58 to its home position, engaging the high speed ratio.

(3) Controlled Change high to low

Auto Change low to high

Air is supplied to port 61 at a sufficient pressure to prevent the clutch members 26 and 27 from parting. Air at a lower pressure is supplied to port 63, this pressure being prevented from entering the cylinder 59, as the operation sensing valve 60 is closed. With the gearbox in operation, the application of a load to the output shaft 14 will not cause the clutch members 26 and 27 to part, as the resistance of the piston 58 is too high. Sufficient load applied to the output shaft 14 will cause the motor to stall in the high speed gear.

There are two methods by which the unit can be signalled to change gear:

(a) by momentarily cutting the signal at port 61.
(b) by momentarily applying a pressure signal to port 62.

Both of these methods allow the piston 58 to move forward sufficiently, to allow the operation sensing valve 60 to open. This will allow the air at port 63, to enter the rear chamber of cylinder 59, and to act on the rear face of the piston 58, thereby reducing the pull of the piston 58 sufficiently to allow the high speed clutch 12 to initiate a gear change.

Method (a) will allow for a signal to be received from port 62, to indicate a gear change.

Reducing the torque at the output shaft 14 sufficiently will allow the piston 58 to return to its home position, changing the unit back into the high speed ratio. In the home position the piston will be reset to be under the influence of the high pressure at port 61 only.

(4) Controlled Change high to low

Controlled Change low to high

High pressure is applied to port 61 as in the previous mode.

With pressure on the unit is held in the high speed ratio.

With pressure off the unit is held in the low speed ratio.

It is to be understood that the nut running tools described above do not have to be driven by a pneumatic motor as any other suitable motor may be substituted therefor.

It is also to be understood that instead of the epicyclic gear mechanism 11 any other appropriate reduction gear mechanism having a high speed low torque output drive and a low speed high torque output drive could be employed.

Moreover, the gearbox could be re-arranged so that it is the driving rather than the driven clutch member which is axially movable whilst the driven clutch member is effectively fixed axially. In one embodiment of this alternative arrangement, the slidable coupling will be rotatable with the output shaft rather than with the low speed output drive. The rear hollow end of the output shaft will be lengthened and the low speed output drive shortened as compared with the embodiments described above and the helically edged apertures will be arranged in the rear hollow end of the output shaft. The slidable coupling will be capable of limited angular movement relative to the output shaft and the slidable coupling and low speed output drive will have mutually engageable splines. The driving clutch member will be urged towards the driven clutch member by a strong compression spring, fluid pressure operated device or the like and a weak spring urging the slidable coupling towards the low speed output drive will be mounted relative to the output shaft.

I claim:

1. A two speed gearbox comprising:

an input shaft and an output shaft;

a reduction gear mechanism drivable by said input shaft and having a high speed low torque output drive and a low speed high torque output drive;

a clutch having driving and driven clutch members, one of which is axially movable relative to the other, said clutch connecting said high speed output drive to said output shaft when said clutch members are fully engaged;

a slidable coupling rotatable with one of the low speed output drive and the output shaft and movable between a first position in which said coupling is disconnected from the other of said low speed output drive and said output shaft and a second position in which said coupling is connected thereto for driving said output shaft;

means for urging said slidable coupling towards said second position;

means for releasably maintaining said clutch members in full engagement;

means for maintaining said slidable coupling in its first position against the force of said urging means when said clutch members are maintained in full engagement; and means for maintaining said clutch members fully out of engagement when said slidable coupling is in its second position;

said clutch, urging means, and maintaining means, being effective in both directions of rotation of the input shaft.

2. A two speed gearbox comprising:

an input shaft and an output shaft;

a reduction gear mechanism drivable by said input shaft and having a high speed low torque output drive and a low speed high torque output drive;

a clutch having driving and driven clutch members, one of which is axially movable relative to the other, said clutch connecting said high speed output drive to said output shaft when said clutch members are fully engaged;

a slidable coupling rotatable with one of the low speed output drive and the output shaft and movable between a first position in which said coupling is disconnected from the other of said low speed output drive and said output shaft and a second position in which said coupling is connected thereto for driving said output shaft;

means for urging said slidable coupling towards said second position;

means for releasably maintaining said clutch members in full engagement;

at least one ball held captive with said slidable coupling;

a radial flange on said one axially movable clutch member, said slidable coupling being maintained in said first position against the force of said urging means when said clutch members are maintained in full engagement by engagement between said radial flange and said at least one ball;

means for maintaining said clutch members fully out of engagement when said slidable coupling is in said second position;

said clutch, urging means, and maintaining means, being effective in both directions of rotation of said input shaft.

3. The gearbox as claimed in claim 2 wherein:

said slidable coupling is capable of limited angular movement relative to said one of said low speed output drive of said reduction gear mechanism and said output shaft; and said low speed output drive comprises a hollow part having a wall radially interposed between said slidable coupling and said clutch and at least one aperture in said will receiving said at least one ball, said aperture having two generally helical edges of opposite hand, so that, in use, when said one axially movable clutch member begins to move away from said other clutch member and said slidable coupling comes into engagement with said other of the low speed output drive and said output shaft, limited relative angular movement of said one of the low speed output drive and said output shaft, on the one hand, and said slidable coupling, on the other hand, will cause said at least one ball to move along one of said two generally helical edges of said aperture to move said slidable coupling into full engagement with the other of the low speed output drive and said output shaft driven and driving clutch members fully out of engagement.

4. The gearbox as claimed in claim 3, wherein:

mutually engageable teeth are provided on said one of the low speed output drive of the reduction gear and said output shaft, and said slidable coupling, said teeth being arranged to provide for said limited angular movement and which drivingly connect said slidable coupling to said one of the low speed output drive and said output shaft when said slidable coupling is in full engagement with the other of the low speed output drive and said output shaft.

5. The gearbox as claimed in claim 1 wherein:

said clutch comprises a torque sensitive clutch; and said driving and driven clutch members are in full engagement when the torque applied to said output shaft is below a predetermined value.

6. The gearbox as claimed in claim 5 wherein:

said means for releasably maintaining said clutch members in full engagement comprises a compression spring.

7. A two speed gearbox comprising:

an input shaft and an output shaft;

a reduction gear mechanism drivable by said input shaft and having a high speed low torque output drive and a low speed high torque output drive;

a torque sensitive clutch having driving and driven clutch members, one of which is axially movable relative to the others, said clutch connecting said high speed output drive to said output shaft when said clutch members are fully engaged, the full engagement being when the torque applied to said output shaft is below a predetermined value;

a slidable coupling rotatable with one of the low speed output drive and the output shaft and movable between a first position in which said coupling is disconnected from the other of said low speed output drive and the output shaft and a second position in which said coupling is connected thereto for driving said output shaft;

means for urging said slidable coupling towards said second position;

compression spring means for releasably maintaining said clutch members in full engagement;

means for varying the compression of said spring and thereby the torque at which the clutch will operate;

said slidable coupling being maintained in said first position against the force of said urging means when said clutch members are maintained in full engagement; and means for maintaining said clutch members fully out of engagement when said slidable coupling is in said second position;

said clutch, urging means, and maintaining means, being effective in both directions of rotation of said input shaft.

8. A two speed gearbox comprising:

an input shaft and an output shaft;

a reduction gear mechanism drivable by said input shaft and having a high speed low torque output drive and a low speed high torque output drive;

a torque sensitive clutch having driving and driven clutch members, one of which is axially movable relative to the other, said clutch connecting said high speed output drive to said output shaft when said clutch members are fully engaged, the full engagement being when the torque applied to said output shaft is below a predetermined value;

a slidable coupling rotatable with one of the low speed output drive and the output shaft and movable between a first position in which said coupling is disconnected from the other of said low speed output drive and the output shaft and a second position in which said coupling is connected thereto for driving said output shaft;

means for urging said slidable coupling towards said second position;

a fluid pressure operated device connected to said one axially movable clutch member via a thrust bearing for releasably maintaining said clutch members in full engagement, being such that said one axially movable clutch member will move away from the other clutch member when the torque applied to said output shaft exceeds said predetermined value;

said slidable coupling being maintained in said first position against the force of said urging means when said clutch members are maintained in full engagement; and means for maintaining said clutch members fully out of engagement when said slidable coupling is in said second position;

said clutch, urging means, and maintaining means, being effective in both directions of rotation and said input shaft.

9. A two speed gearbox comprising:

an input shaft and an output shaft;

a reduction gear mechanism drivable by said input shaft and having a high speed low torque output drive and a low speed high torque output drive;

a clutch having driving and driven clutch members, one of which is axially movable relative to the other, said clutch connecting said high speed output drive to said output shaft when said clutch members are fully engaged;

a slidable coupling rotatable with one of the low speed output drive and the output shaft and movable between a first position in which said coupling is disconnected from the other of said low speed output drive and the output shaft and a second position in which said coupling is connected thereto for driving said output shaft;

means for urging said slidable coupling towards said second position;

means for releasably maintaining said clutch members in full engagement comprising a fluid pressure operated device connected to said one axially movable clutch member via a thrust bearing, the force applied by the fluid pressure operated device being such that the clutch members will be maintained in engagement regardless of the torque applied to the output shaft until that force is at least reduced;

said slidable coupling being maintained in said first position against the force of said urging means when said clutch members are maintained in full engagement; and means for maintaining said clutch members fully out of engagement when said slidable coupling is in said second position;

said clutch, urging means, and maintaining means, being effective in both directions of rotation of said input shaft.

10. The gearbox as claimed in claim 1, wherein:

said driving clutch member is effectively axially fixed relative to said reduction gear mechanism;

said driven clutch member is axially movable relative to said driving clutch member; and said slidable coupling is rotatable with the low speed output drive of the reduction gear mechanism.

11. The gearbox as claimed in claim 2 wherein:

said driving clutch member is effectively axially fixed relative to said reduction gear mechanism;

said driven clutch member is axially movable relative to said driving clutch member; and said slidable coupling is rotatable with the low speed output drive of the reduction gear mechanism.

12. The gearbox as claimed in claim 7 wherein:

said driving clutch member is effectively axially fixed relative to said reduction gear mechanism;

said driven clutch member is axially movable relative to said driving clutch member; and said slidable coupling is rotatable with the low speed output drive of the reduction gear mechanism.

13. The gearbox as claimed in claim 8 wherein:

said driving clutch member is effectively axially fixed relative to said reduction gear mechanism;

said driven clutch member is axially movable relative to said driving clutch member; and said slidable coupling is rotatable with the low speed output drive of the reduction gear mechanism.

14. The gearbox as claimed in claim 9 wherein:

said driving clutch member is effectively axially fixed relative to said reduction gear mechanism;

said driven clutch member is axially movable relative to said driving clutch member; and said slidable coupling is rotatable with the low speed output drive of the reduction gear mechanism.

* * * * *